US012578752B2

(12) United States Patent
Kim

(10) Patent No.: US 12,578,752 B2
(45) Date of Patent: Mar. 17, 2026

(54) DISPLAY DEVICE AND METHOD FOR OPERATING THE SAME

(71) Applicant: LG ELECTRONICS INC., Seoul (KR)

(72) Inventor: Minhan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 18/120,333

(22) Filed: Mar. 10, 2023

(65) Prior Publication Data

US 2024/0004418 A1     Jan. 4, 2024

(30) Foreign Application Priority Data

Jul. 1, 2022     (KR) ........................ 10-2022-0081432

(51) Int. Cl.
| | |
|---|---|
| *G06F 1/08* | (2006.01) |
| *G06F 1/3218* | (2019.01) |
| *H04N 5/63* | (2006.01) |
| *H04N 7/15* | (2006.01) |

(52) U.S. Cl.
CPC .............. *G06F 1/08* (2013.01); *G06F 1/3218* (2013.01); *H04N 5/63* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 6,049,886 A | * | 4/2000 | Motoyama | ......... H04N 21/4305 |
| | | | | 713/400 |
| 6,404,422 B1 | | 6/2002 | Choi | |
| 7,961,000 B1 | * | 6/2011 | Gross | .................. H04L 25/0278 |
| | | | | 326/82 |
| 2006/0158554 A1 | * | 7/2006 | Cho | ........................ G09G 5/005 |
| | | | | 348/521 |

(Continued)

FOREIGN PATENT DOCUMENTS

| | | |
|---|---|---|
| CN | 107024788 | 8/2017 |
| JP | 2005-091385 | 4/2005 |

(Continued)

OTHER PUBLICATIONS

Korean Intellectual Property Office Application No. 10-2022-0081432, Office Action dated Jan. 22, 2024, 5 pages.

(Continued)

*Primary Examiner* — Mushfikh I Alam
(74) *Attorney, Agent, or Firm* — LEE, HONG, DEGERMAN, KANG & WAIMEY

(57) ABSTRACT

Disclosed are a display device and a method for operating the same. The display device includes a memory, a display, and a processor configured to set a first video output clock frequency for an input signal and output a video based on the set first video output clock frequency, wherein the processor is configured to set at least one second video output clock frequency, calculate an optimal video output clock frequency based on device performance information according to each set video output clock frequency and set the calculated optimal video output clock frequency as a video output clock frequency for the input signal.

12 Claims, 11 Drawing Sheets

100

(56) References Cited

U.S. PATENT DOCUMENTS

| | | | | |
|---|---|---|---|---|
| 2009/0327777 | A1* | 12/2009 | Vasquez | G09G 3/3611 |
| | | | | 348/700 |
| 2013/0166580 | A1* | 6/2013 | Maharajh | G06F 16/437 |
| | | | | 707/758 |
| 2014/0177735 | A1* | 6/2014 | Nonaka | H04N 21/43635 |
| | | | | 375/240.27 |
| 2016/0066000 | A1* | 3/2016 | Cunningham | H04N 21/44004 |
| | | | | 725/116 |
| 2016/0359574 | A1* | 12/2016 | Lee | H04L 67/51 |
| 2017/0032735 | A1 | 2/2017 | Lee et al. | |
| 2017/0221434 | A1 | 8/2017 | Shima | |
| 2018/0031898 | A1 | 2/2018 | Tanaka et al. | |
| 2019/0163435 | A1* | 5/2019 | Lambert | G06F 3/162 |
| 2021/0233501 | A1 | 7/2021 | Chaudhari et al. | |
| 2022/0109713 | A1* | 4/2022 | Huang | H04L 65/75 |
| 2023/0188764 | A1* | 6/2023 | Pahalawatta | H04N 19/179 |
| | | | | 725/116 |

FOREIGN PATENT DOCUMENTS

| | | |
|---|---|---|
| JP | 2021-117971 | 8/2021 |
| KR | 10-2003-0013991 | 2/2003 |
| KR | 100596586 | 7/2006 |
| KR | 100661167 | 12/2006 |
| KR | 10-2017-0014950 | 2/2017 |

OTHER PUBLICATIONS

European Patent Office Application Serial No. 23161371.2, Search Report dated May 11, 2023, 12 pages.
Korean Intellectual Property Office Application No. 10-2022-0081432, Office Action dated Jun. 25, 2025, 2 pages.

* cited by examiner

| VO CLK Table | | |
|---|---|---|
| Resolution | Codec | Default(MHz) |
| 2K 30 | | 200 |
| 2K 50 | | 250 |
| 2K 60 | | 300 |
| 2K 100 | AV1 | 400 |
| 2K 120 | VVC | 450 |
| 4K 30 | HEVC | 300 |
| 4K 50 | VP9 | 400 |
| 4K 60 | AVS | 450 |
| 4K 100 | | 500 |
| 4K 120 | | 600 |

(a)

(b)

(a)

(b)

DISPLAY DEVICE AND METHOD FOR OPERATING THE SAME

CROSS-REFERENCE TO RELATED APPLICATION(S)

Pursuant to 35 U.S.C. § 119(a), this application claims the benefit of earlier filing date and right of priority to Korean Patent Application No. 10-2022-0081432, filed on Jul. 1, 2022, the contents of which are hereby incorporated by reference herein in its entirety.

BACKGROUND OF THE INVENTION

1. Field of the Invention

The present disclosure relates to a display device, and more particularly, to a display device for automatically setting an optimal video output clock frequency according to an input, and a method for operating the same.

2. Discussion of the Related Art

A display device is a device having a function of receiving, processing, and displaying an image which a user is able to watch.

A conventional display device mainly receives a broadcast signal of a channel selected by a user among broadcast signals transmitted from a broadcasting station, separates a video signal from the received signal, and displays the separated video signal on a display.

Recently, content providers (CPs) that provide various content have been created in addition to the broadcasting station, and the display device needs to be able to process the content received from the CP.

In the process of providing content obtained through various CPs as described above, the conventional display device has used a fixed video output clock frequency regardless of an input. Accordingly, in the conventional display device, the data throughput is increased, the core power ripple is large, the chip temperature is increased due to heat generation, and the set is unstable and the power consumption is increased, causing a decrease in the lifespan of a board.

Therefore, there is a need for a method for solving these problems.

SUMMARY OF THE INVENTION

An object of the present disclosure is to provide a display device and a method of operating the same for automatically setting an optimal video output clock frequency by adaptively adjusting a video output clock frequency, which has been always fixed in the prior art, according to an input.

The display device includes a memory, a display, and a processor configured to set a first video output clock frequency for an input signal and output a video based on the set first video output clock frequency, wherein the processor is configured to set at least one second video output clock frequency, calculate an optimal video output clock frequency based on device performance information according to each set video output clock frequency and set the calculated optimal video output clock frequency as a video output clock frequency for the input signal.

A method for operating a display device, comprising: detecting a change in resolution according to an input signal; setting a first video output clock frequency according to a changed resolution and outputting a video based on the set first video output clock frequency; tuning the input signal to at least one second video output clock frequency within a preset range based on the set first video output clock frequency; and calculating an optimal video output clock frequency corresponding to the input signal based on the set first video output clock frequency and device performance information according to the tuned each video output clock frequency and applying the calculated video output clock frequency to the input signal.

BRIEF DESCRIPTION OF THE DRAWINGS

FIG. 7 illustrates an example of a VO CLK table according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen.

Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Hereinafter, the display device according to the embodiment of the present disclosure will be described by taking a display device as an example for convenience of description, but the present disclosure is not limited thereto.

Figure 1:
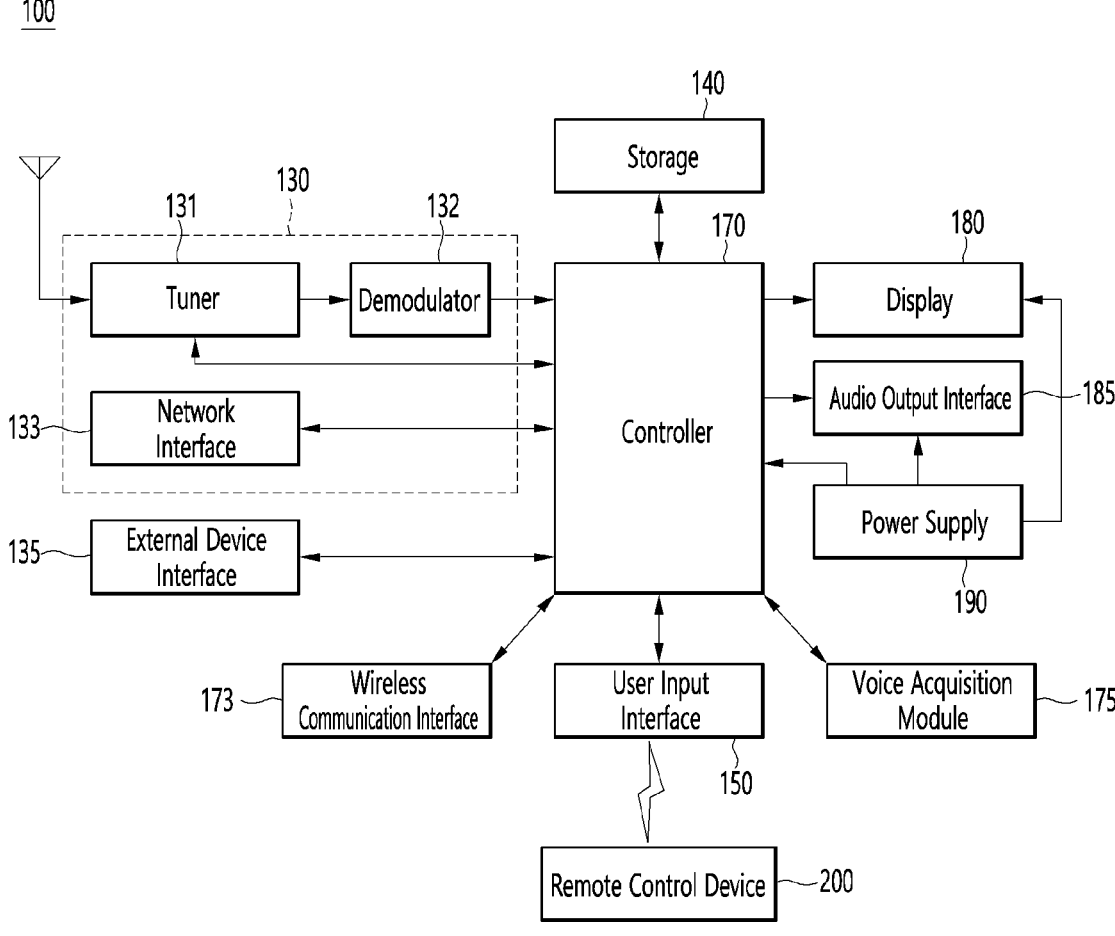
FIG. 1 is a block diagram illustrating a configuration of a display device according to an embodiment of the present disclosure.

FIG. 1 is a block diagram illustrating a configuration of a display device 100 according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, video on demands (VODs), and broadcast signals and information related thereto provided from a content provider or a network provider through a network.

In addition, the network interface 133 may receive update information and update files of firmware provided by the network operator, and may transmit data to an Internet or a content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a Ultra Wideband (UWB) communication method, a ZigBee communication method, a Radio Frequency (RF) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

Also, the audio signal processed by the controller 170 may be input to the external output device through the external device interface 135.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), UWB, ZigBee, Near Field Communication (NFC), Wi-Fi (Wireless-Fidelity), Wi-Fi Direct, and Wireless Universal Serial Bus (USB) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and on screen display (OSD) signals processed by the controller 170, or image signals or data signals received from the external device interface 135 into R, G, and B signals, and generate drive signals.

Meanwhile, since the display device 100 shown in FIG. 1 is an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
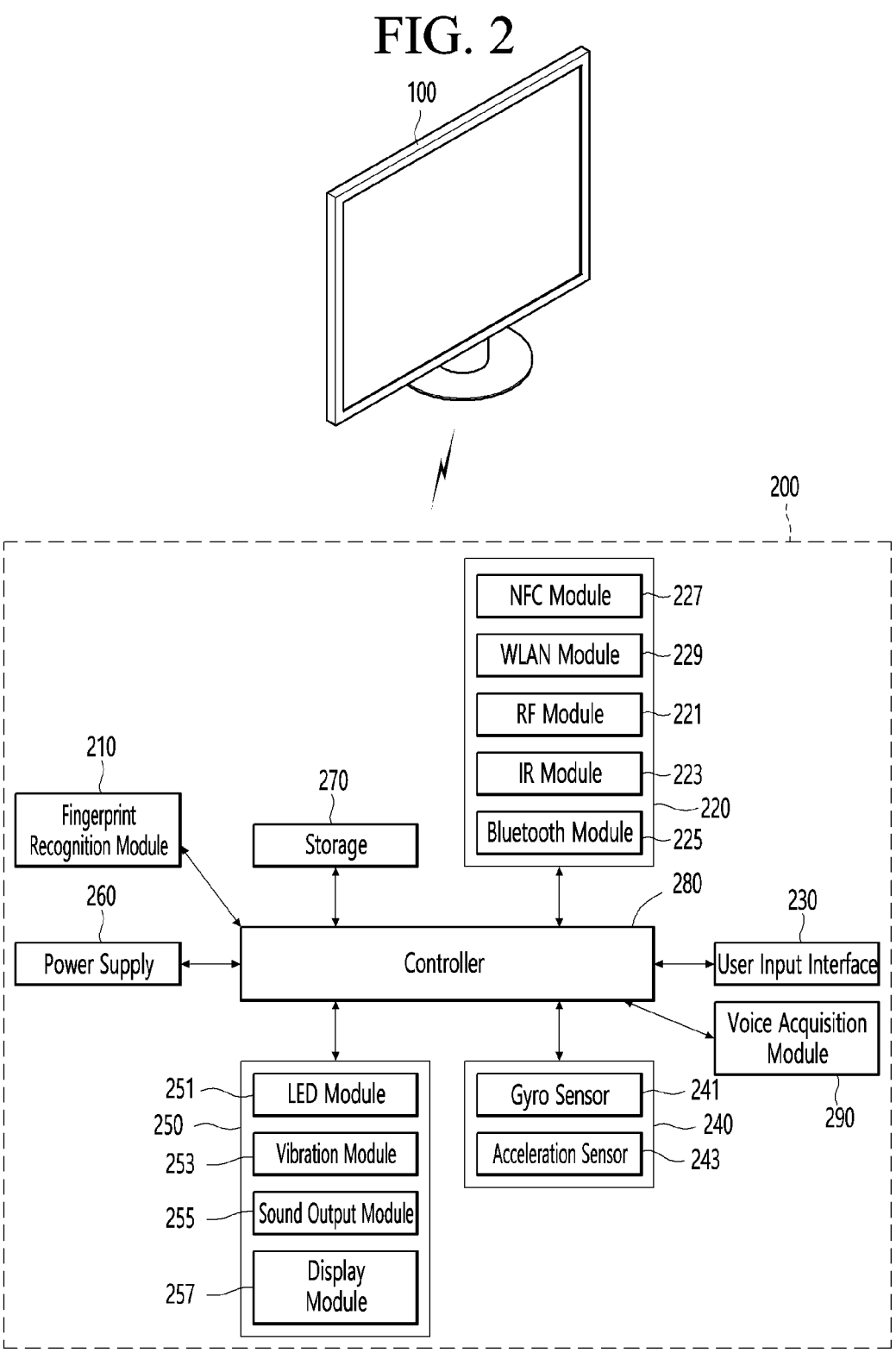
FIG. 2 is a block diagram of a remote control device according to an embodiment of the present disclosure.
Figure 3:
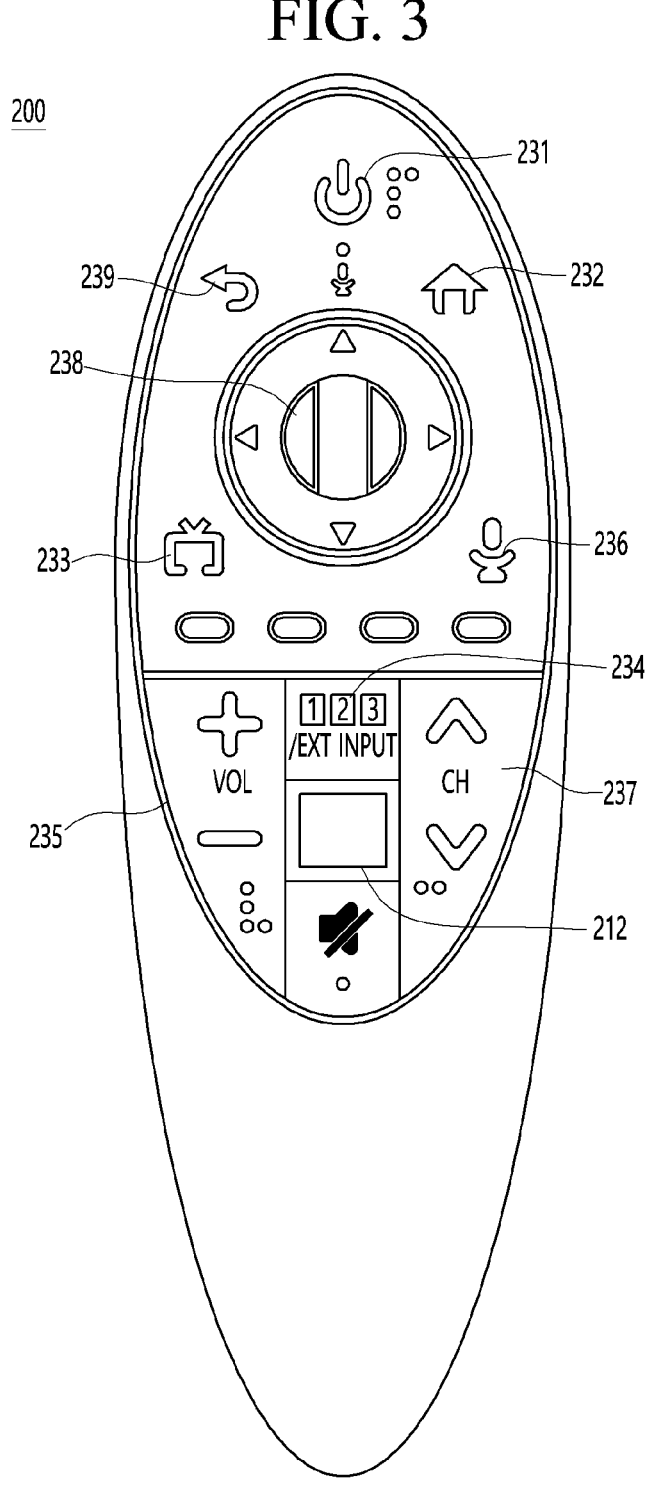
FIG. 3 illustrates an example of an actual configuration of a remote control device according to an embodiment of the present disclosure.

FIG. 2 is a block diagram of a remote control device 200 according to an embodiment of the present disclosure, and FIG. 3 illustrates an actual configuration example of the remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC communication standard, and a WLAN circuit 229 capable of transmitting and receiving signals to and from the display device 100 according to the WLAN communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure. The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
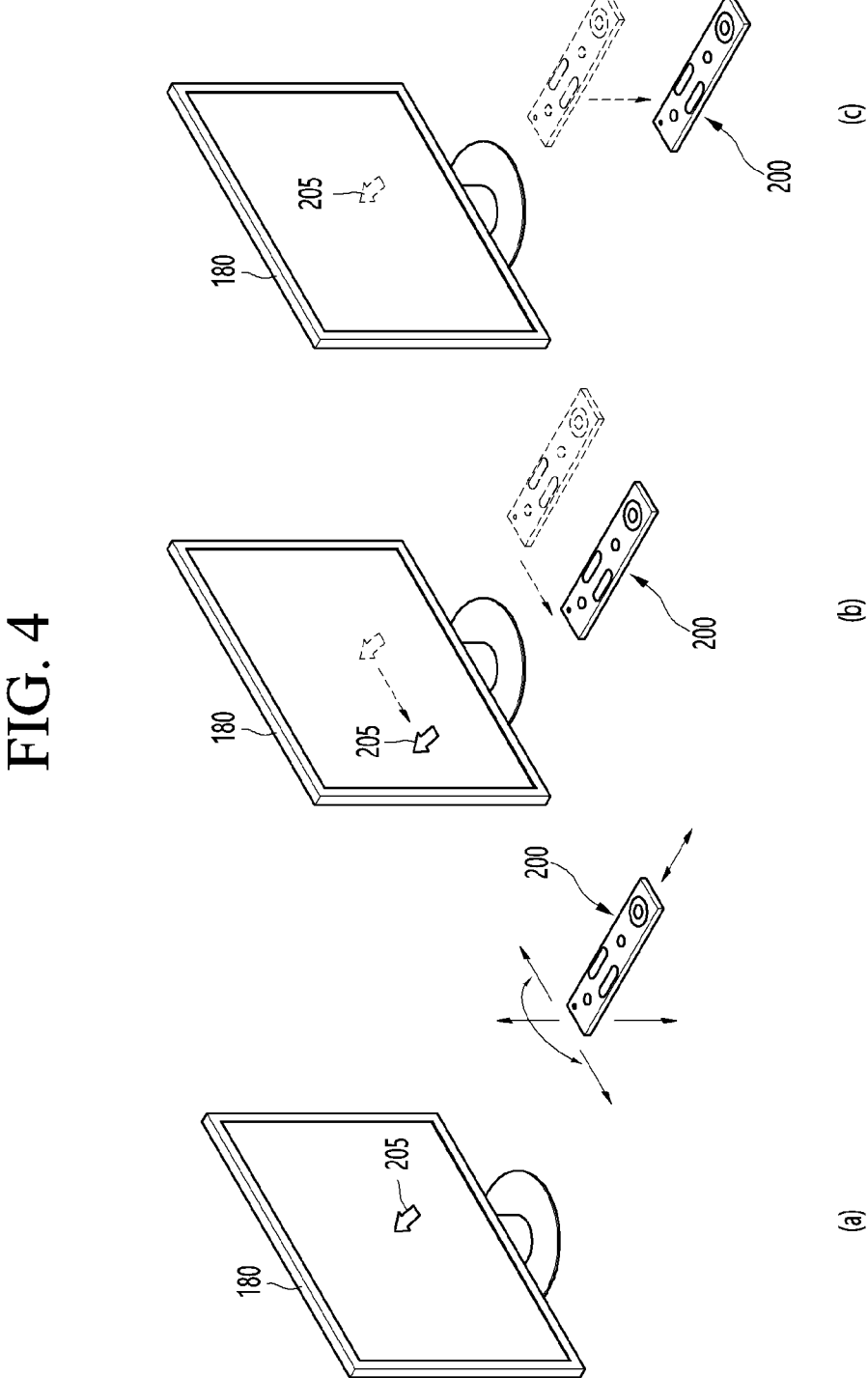
FIG. 4 illustrates an example of using a remote control device according to an embodiment of the present disclosure.

FIG. 4 illustrates an example of using a remote control device according to an embodiment of the present disclosure.

FIG. 4(*a*) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In FIG. 4(*b*), it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In FIG. 4(*c*), it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 8:
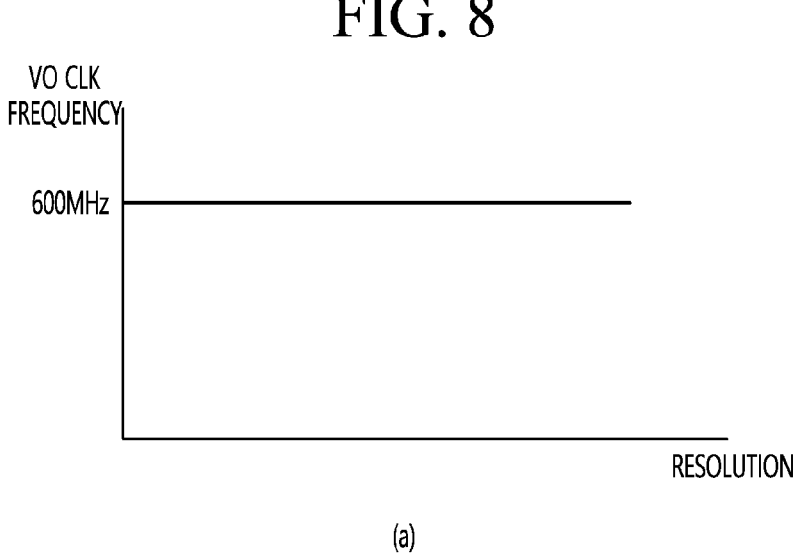
FIG. 8 is a diagram illustrating relationships between resolutions and VO CLK frequencies in relation to the present disclosure.
Figure 8:
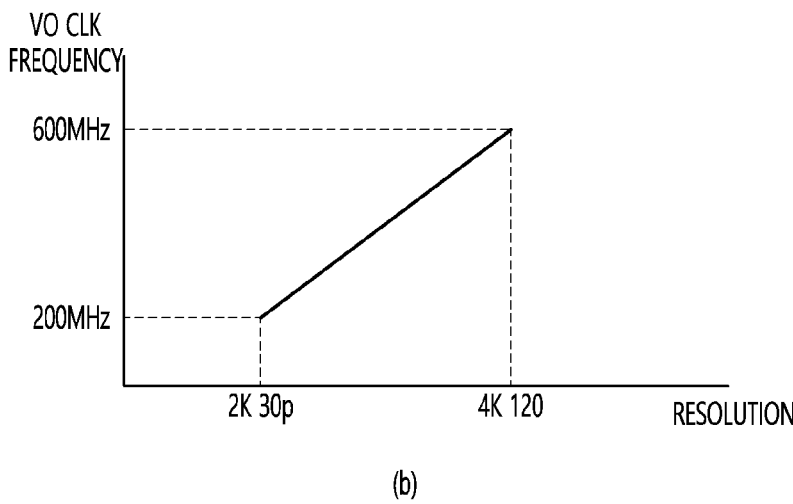

Hereinafter, a display device 100 and an operating method therefor will be described below, which automatically set an optimal video output (VO) clock (CLK) frequency for a corresponding input by adaptively adjusting a VO CLK frequency (hereinafter referred to as 'VO CLK frequency'), for which a fixed value has always used as in FIG. 8(*a*), according to an input as shown in FIG. 8(*b*). For convenience of description, the relationship between the resolution of the input and the VO CLK frequency has been described as an example in FIG. 8, but the present disclosure is not limited thereto.

Therefore, it is possible to automatically set a corresponding default VO CLK frequency according to an input, calculate an optimal VO CLK frequency for the corresponding input based on an adaptive VO CLK frequency algorithm after automatic setting and set the calculated VO CLK frequency to the optimal VO CLK frequency for the input. In this case, the display device 100 may be configured to perform the above-described process, for example, in the background, and set optimal conditions for heat generation and power consumption while preventing deterioration in the image quality of a video output through the process to prevent an increase in the temperature of the chip or lower the temperature of the chip and as a result, dramatically increasing the lifespan of the corresponding chip and further the lifespan of the display device 100.

To this end, the display device 100 according to an embodiment of the present disclosure may set a first VO CLK frequency (that is, a default VO CLK frequency) for a memory, a display, and an input signal, and output a video based on the first VO CLK frequency. The display device 100 may include a controller that is configured to set at least one second VO CLK frequency simultaneously while outputting a video based on the first VO CLK frequency, calculate the optimal VO CLK frequency based on device performance information according to each VO CLK frequency set, and set the calculated optimal VO CLK frequency to a VO CLK frequency for the input signal.

Hereinafter, a process of setting the first VO CLK frequency according to an input and a process of calculating and setting the set optimal VO CLK frequency will be described, respectively.

Figure 5:
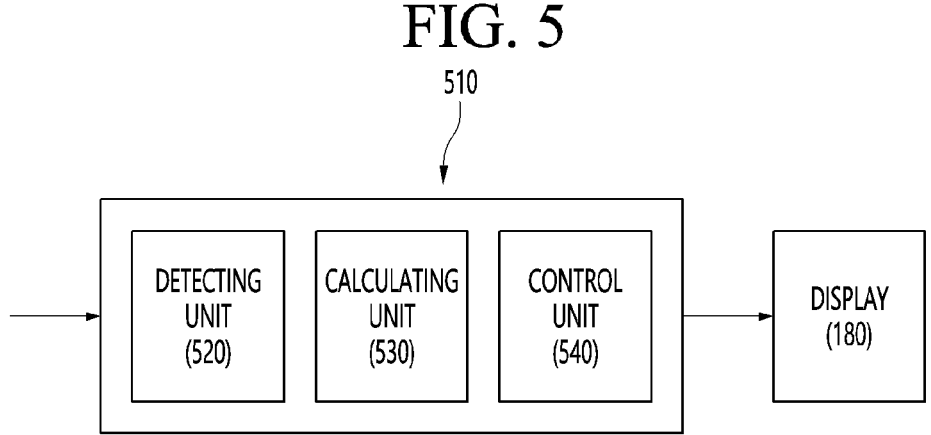
FIG. 5 is a block diagram of a display device including a video output clock processing unit according to an embodiment of the present disclosure.

FIG. 5 is a block diagram of the display device 100 including a processor 510 according to an embodiment of the present disclosure.

Referring to FIG. 5, the display device 100 may include the processor 510. In this case, the processor 510 may include a detecting unit 520, a calculating unit 530, and a control unit 540. However, the present disclosure is not limited thereto. Meanwhile, although not shown in FIG. 5, the memory 140 of FIG. 1 may be further referenced.

The detecting unit 520 may be configured to detect whether a change in resolution, a change in temperature/power consumption or the like has occurred according to an input signal.

When a change in resolution is detected through the detecting unit 520, the calculating unit 530 may be configured to calculate device performance information values according to at least one VO CLK frequency (e.g., the second VO CLK frequency) while changing a VO CLK frequency with respect to the first VO CLK frequency previously set for the changed resolution. The first VO CLK frequency may represent, for example, a value mapped to a corresponding resolution from the VO CLK table of FIG. 7.

The control unit 540 may be configured to select and determine an optimal VO CLK frequency for the corresponding resolution by referring to the device performance information values calculated by the calculating unit 530, and perform control to output a video according to the changed VO CLK frequency through the display 180 by performing adjustment to change from the first VO CLK frequency to the determined VO CLK frequency.

The display 180 may be configured to output a video.

Herein, at least one second VO CLK frequency may be set to be tuned for the input signal regardless of the device performance information according to the first VO CLK frequency.

The at least one second VO CLK frequency may be also set to be tuned for the input signal according to the device performance information according to the first VO CLK frequency.

The at least one second VO CLK frequency may be set to be tuned for the input signal based on the first VO CLK frequency.

Herein, the device performance information may include at least one of image quality data of an output video, and data on a change in chip temperature and power consumption, based on the corresponding VO CLK frequency.

In this case, the image quality data may be used to determine whether the image quality of the output video is deteriorated based on whether at least one image quality factor is enabled, the image quality factor including a Cyclic Redundancy Check (CRC) value for determining whether there is a data error, dynamic color and dynamic contrast, Garmmet, Frame Rate Conversion (FRC) and local dimming.

The control unit 540 may be configured to set priorities for the image quality data of the output video included in the device performance information and data on a change in chip temperature and power consumption and assign weights according to the set priorities.

The control unit 540 may be configured to calculate device performance information based on a result of summing the weights of the image quality data and the data on a change in chip temperature and power consumption according to each VO CLK frequency and calculate an optimal VO CLK frequency based on the calculated device performance information for each VO CLK frequency.

The control unit 540 may be configured to determine, as the optimal VO CLK frequency, the lowest VO CLK frequency among at least one or more second VO CLK frequencies while at least one piece of data related to the device performance information according to the input signal tuning is less than a first threshold.

When a difference between device performance information according to the first VO CLK frequency and device performance information according to at least one or more second VO CLK frequencies according to the input signal tuning is less than a second threshold, the control unit 540 may be configured to select a lower VO CLK frequency from among the first VO CLK frequency and the lowest second VO CLK frequency in the case of the input signal tuning.

When a difference between the first VO CLK frequency and the lowest second VO CLK frequency in the case of the input signal tuning is equal to or greater than a third threshold, the control unit 540 may be configured to determine the lowest second VO CLK frequency as the optimal VO CLK frequency.

When a difference between the device performance information according to the first VO CLK frequency and the average value of the device performance information according to all VO CLK frequencies according to the input signal tuning is less than a fourth threshold, the control unit 540 may be configured to perform control to maintain the first VO CLK frequency.

The control unit may be configured to perform control to set the first VO CLK frequency when there is a change in resolution according to the input signal.

Hereinafter, an operating method of the display device 100 will be described in more detail with reference to the accompanying drawings.

The display device 100 may be configured to detect a change in resolution according to an input signal, set a first VO CLK frequency according to the changed resolution, and output a video. In this case, the display device 100 may tune an input signal to at least one second VO CLK frequency within a preset range with respect to the set first VO CLK frequency.

In addition, the display device 100 may be configured to calculate a third VO CLK frequency corresponding to the input signal based on device performance information according to the set first VO CLK frequency and each tuned second VO CLK frequency, that is, the optimal VO CLK frequency and perform control such that the calculated VO CLK frequency is applied to the input signal.

Figure 6:
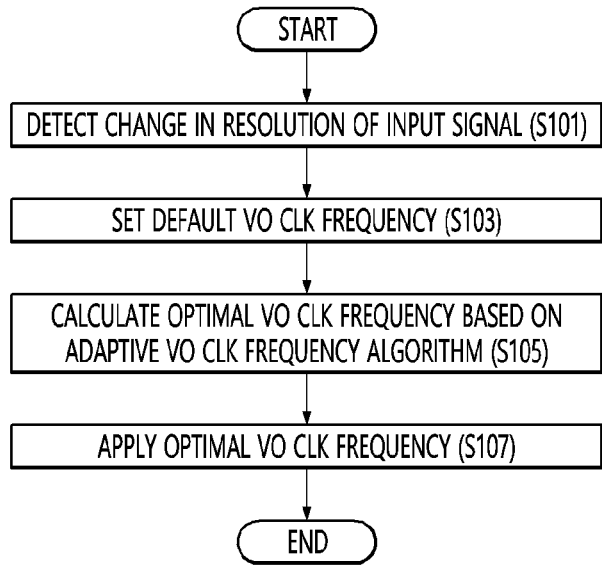
FIG. 6 is a flowchart illustrating a video output clock frequency processing method in a display device according to an embodiment of the present disclosure.

FIG. 6 is a flowchart for a method of processing a VO CLK frequency in a display device (100) according to an embodiment of the present disclosure.

First, referring to FIG. 6, when detecting a change in resolution according to an input signal (S101), the processor 510 may be configured to set a first VO CLK frequency corresponding to the detected resolution (S103).

In this case, the processor 510 may be configured to process an input signal based on the set first VO CLK frequency and output a video through the display 180.

After the step S103, the processor 510 may be configured to calculate an optimal VO CLK frequency for the corresponding resolution based on the adaptive VO CLK frequency estimation algorithm (S105), and apply the calculated optimal VO CLK frequency to the input signal (S107). Accordingly, the processor 510 may be configured to process the input signal according to the applied VO CLK frequency and perform control such that a video is output through the display 180 after step S107.

FIG. 7 illustrates an example of a VO CLK table according to an embodiment of the present disclosure.

Referring to FIG. 7, a resolution in a first column, codec information in a second column, and a default VO CLK frequency in a third column are mapped and defined. Referring to the codec information, there is no change in resolution and default VO CLK frequency in the case of the listed codecs, for example, AOMedia Video 1 (AV1), Versatile Video Coding (VVC), High Efficiency Video Coding (HEVC), VP9, Audio Video Coding Standard (AVS), and the like, but the default VO CLK frequency compared to the resolution defined in the VO CLK table of FIG. 7 may be changed when codecs are not the codecs listed above.

Referring to FIG. 7, when the resolution is 2K 30, the default VO CLK frequency is assigned (set to) 200, and when the resolution is 4K 120, the default VO CLK frequency is 600 MHz (maximum VO CLK frequency). However, this is for the purpose of helping the understanding of the present disclosure and for convenience of description, and the present disclosure is not limited to the contents shown in FIG. 7.

Meanwhile, although definition is made for the resolutions of 2K and 4K in FIG. 7, the present disclosure is not limited thereto, and definition can be made for various resolutions such as Full-HD (FHD) or 8K.

FIG. 8(*a*) illustrates a graph for an example of applying a VO CLK frequency according to an input signal in, for example, a conventional display device. That is, referring to FIG. 8(*a*), the conventional display device always uses a fixed value (e.g., 600 MHz (maximum VO CLK frequency)), from which it can be seen that a VO CLK frequency is applied uniformly regardless of whether or not a resolution is changed according to the input signal.

On the other hand, FIG. 8(*b*) illustrates an example of adaptively controlling the VO CLK frequency in consideration of a change in resolution according to an input signal in the display device 100. FIG. 8(*b*) is an example in which the VO CLK frequency is set linearly according to a resolution within a range of minimum 200 MHz to maximum 600 MHz for convenience. However, the present disclosure is not limited thereto.

Figure 10:
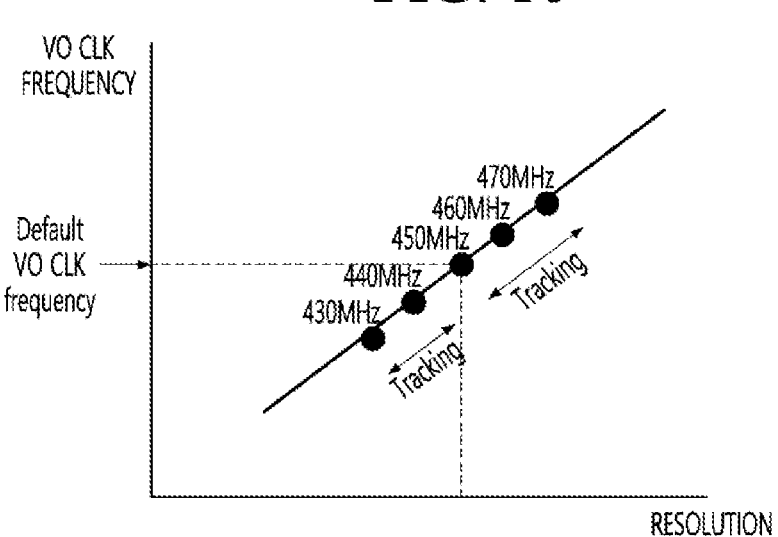
FIGS. 10 and 11 are diagrams illustrating a VO CLK frequency tuning operation in a display device according to an embodiment of the present disclosure.
Figure 10:
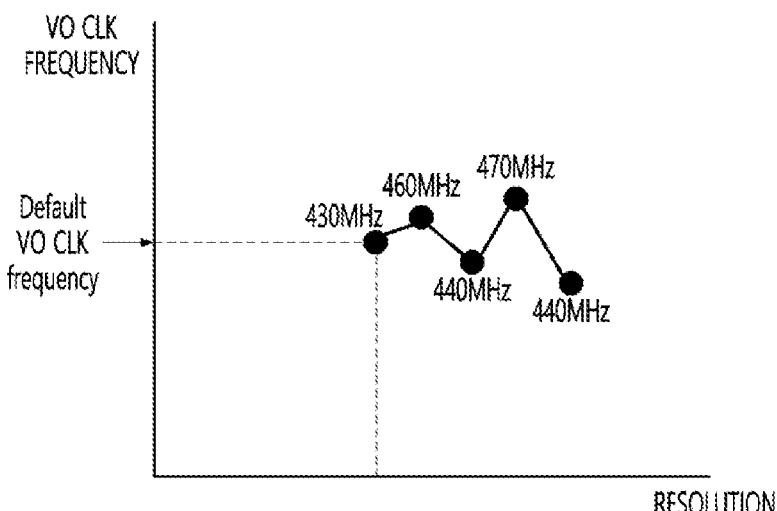

On the other hand, FIG. 8(*b*) illustrates allocation of a default VO CLK frequency, and unlike FIG. 8(*b*), the tuned VO CLK frequency may not be linear as shown in FIG. 10(*b*).

FIG. 10 illustrates an example of tracking an input signal in a predetermined method with respect to the default VO CLK frequency by following the default VO CLK frequency allocated in FIG. 8(*b*).

In FIG. 10(*a*), linear values are used for units of predetermined VO CLK frequencies to be tuned, as shown in FIG. 8(*b*). That is, when the default VO CLK frequency 120 is set to 450 MHz in FIG. 10(*a*), tuning (2 taps) is performed twice each in the left and right tracking range, but each tuning VO CLK frequency is defined as a difference by 10 MHz. However, the present disclosure is not limited thereto.

On the other hand, in FIG. 10(*b*), the difference in the tuned VO CLK frequency is 10 MHz, as shown in FIG. 10(*a*), but it can be seen that the VO CLK frequency values used for tuning are not selected linearly.

Figure 11:
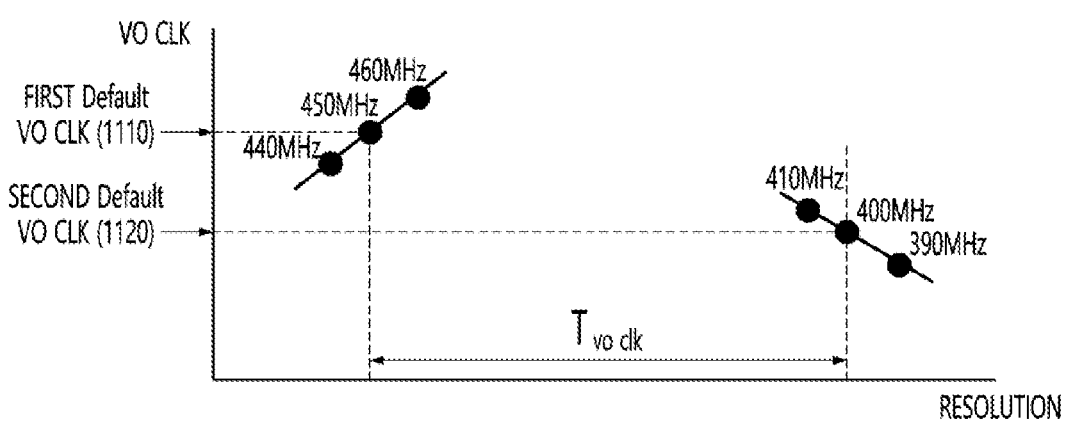

Meanwhile, in FIG. 11, the initially set first default VO CLK frequency 1110 is 450 MHz, and tuning is performed left and right in units of 10 MHz. Thereafter, after a predetermined time (Tvo clk) has elapsed, the display apparatus 100 may set 400 MHz as the second default VO CLK frequency 1120, and similarly perform left and right tuning in units of 10 MHz.

In particular, in FIG. 11, even though the first default VO CLK frequency 1110 is set and tuned in the display apparatus 100, the optimal VO CLK frequency cannot be calculated based on the device performance information from the result, an attempt may be made to calculate the optimal VO CLK frequency by setting and tuning the second default VO CLK frequency 1120 having a different value as shown. This process is repeatedly performed until an optimal VO CLK frequency is calculated, but each default VO CLK frequency value may be changed each time. In addition, in the process, although in FIG. 11, a total of two tunings are performed once left and right, the number or range of tuning may vary according to repetition.

Meanwhile, the frequency difference used for tuning in FIGS. 10 to 11 is 10 MHz, but is not limited thereto, and may be arbitrarily set or updated or corrected through learning.

Next, an adaptive VO CLK frequency estimation algorithm for calculating an optimal VO CLK frequency corresponding to the aforementioned input signal will be described in more detail.

Figure 9:
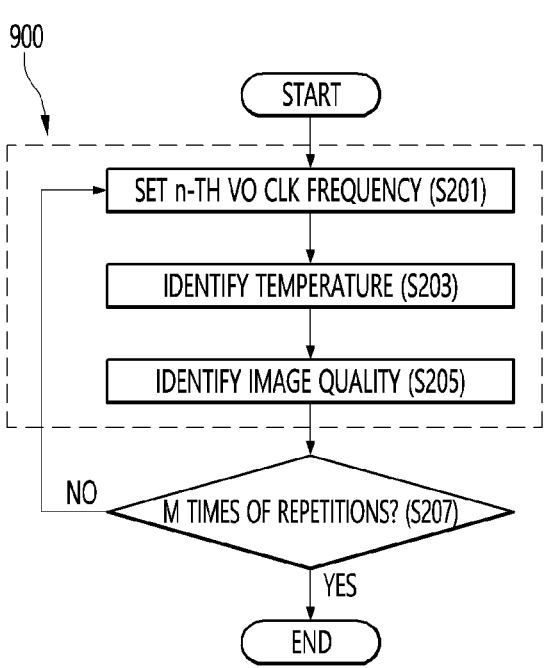
FIG. 9 is a flowchart illustrating a VO CLK frequency processing method in a display device according to another embodiment of the present disclosure.

Referring to FIG. 9, the processor 510 may be configured to set the n-th VO CLK frequency (where n is a natural number) (S201).

In this case, the n-th VO CLK frequency set in step S201 may be one of the second VO CLK frequencies tuned in a predefined range including the first VO CLK frequency.

In the predefined range, tuning may be performed, for example, as shown in FIGS. 10 to 11, while moving by 2 taps to the left and right in units of 10 MHz with respect to the first VO CLK frequency.

The processor 510 may be configured to check the chip temperature and whether there is a data error, according to setting of the n-th VO CLK frequency (S203/S205).

After setting the n-th VO CLK frequency, the processor 510 may be configured to perform control to perform checking of the chip temperature and checking of whether there is data error according to the set VO CLK frequency, that is, steps S201 to S205 as one set, repeatedly "M" times. The "M" is a natural number, may have any value or be determined according to settings. For example, "M" may be '5' including the first VO CLK frequency and other frequencies within a tracking range with reference to FIG. 10(*a*) to 10(*b*). That is, according to FIG. 10(*a*) to 10(*b*), "M" is 5, which may indicate that steps S201 to S205 are repeatedly performed 5 times. It should be noted the value of n may be different in each round.

Therefore, the processor 510 may be configured to determine whether to perform checking of the chip temperature and checking of whether there is data error for all VO CLK frequencies in a corresponding round, that is, the tracking range after step S205 and terminate the operation when it is determined that the checking has been repeatedly performed M times as a result of the determination.

In FIG. 9 as described above, after setting the n-th VO CLK frequency, that is, one specific VO CLK frequency, to determine whether the corresponding VO CLK frequency is an appropriate frequency for the input signal or to find an optimal frequency for the input signal, device performance has been determined by checking the chip temperature and whether there is data error.

Figure 12:
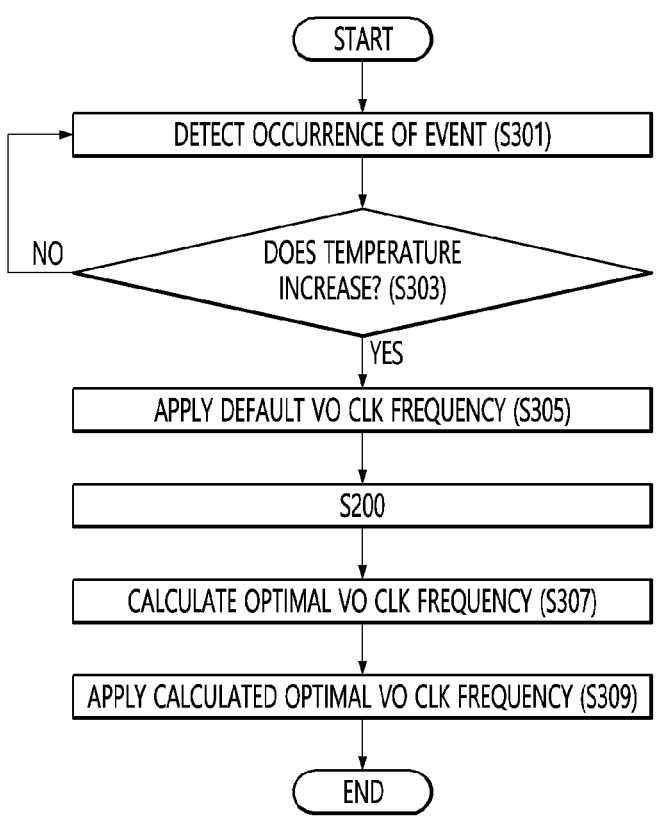
FIGS. 12 and 13 are flowcharts illustrating a VO CLK frequency processing method in a display device according to another embodiment of the present disclosure.

On the other hand, FIG. 12 illustrates a process of detecting the occurrence of an event and controlling the adjustment of a preset (or currently set) VO CLK frequency based on a change in the temperature of a chip (SoC).

Referring to FIG. 12, the processor 510 may be configured to detect occurrence of an event (S301).

When the occurrence of the event is detected, the processor 510 may be configured to determine whether a chip temperature is currently changed, for example, whether the chip temperature has increased compared to a chip temperature before a predetermined time point, or whether an increase in chip temperature is greater than or equal to a predefined threshold (S303). In this case, either one or both of them may be used to determine which the chip temperature is changed. In the latter case, for example, if the temperature increases, the processor 510 may be configured to determine whether an increase in chip temperature is greater than or equal to a threshold.

Meanwhile, in step S303, the predetermined time point determined in advance as a reference for determining whether the temperature is changed may be arbitrarily set, for example, and be sufficient if it is a time point at which the event has occurred (or detected) or before. The predetermined time point is, for example, expressed as a specific numerical value such as 1 minute, 3 minutes, 5 minutes, 1 hour, etc. for the time point at which the event has occurred, or may be an immediately-previous time point at which the event has occurred, the last time point at which the temperature is changed (e.g., increases or decreases), an immediately-previous time point at which determination of whether the chip temperature is changed is performed.

As a result of the determination in step S303, the processor 510 may be configured to ignore or disregard the detected event when the temperature has not increased or the increase in temperature is less than a threshold even if the temperature has increased.

On the other hand, as a result of the determination in step S303, the processor 510 may be configured to perform the operation of the next step when the temperature has increased or the increase in temperature is equal to or greater than the threshold.

The processor 510 may be configured to extract the first VO CLK frequency information in response to the detected event or according to the change in temperature (S305). In this case, for the extraction, for example, a VO CLK table (lookup table) (not shown) may be referred to. For example, in FIG. 10, a lookup table in which resolutions, codec information, and VO CLK frequencies according to input signals are mapped to each other is referred to, while, in FIG. 8, a lookup table in which event types or attribute information, increase width in temperature, and VO CLK frequencies are mapped to each other may be referred to. In this case, in the lookup table referenced in FIG. 12, as the VO CLK frequency, a specific VO CLK frequency as shown in FIG. 7 may be defined, but a variation width of the VO CLK frequency (e.g., +20 MHz, −10 MHz, or the like) may be defined.

The processor 510 may be configured to perform the process 900 of FIG. 9 as described above, at least once or repeat a plurality of times after step S305.

Thereafter, the processor 510 may be configured to calculate an optimal VO CLK frequency corresponding to the detected event or the increase in temperature (S307), and apply the calculated VO CLK frequency instead of a preset VO CLK frequency (S309).

The processor 510 may be configured to detect an event and extract data on a change in chip temperature and power consumption in response to the detected event.

The processor 510 may be configured to perform control to set the first VO CLK frequency only when the extracted amount of change in the chip temperature and power consumption has changed by more than a threshold, compared to the previously-extracted data on the change in chip temperature and power consumption.

Figure 13:
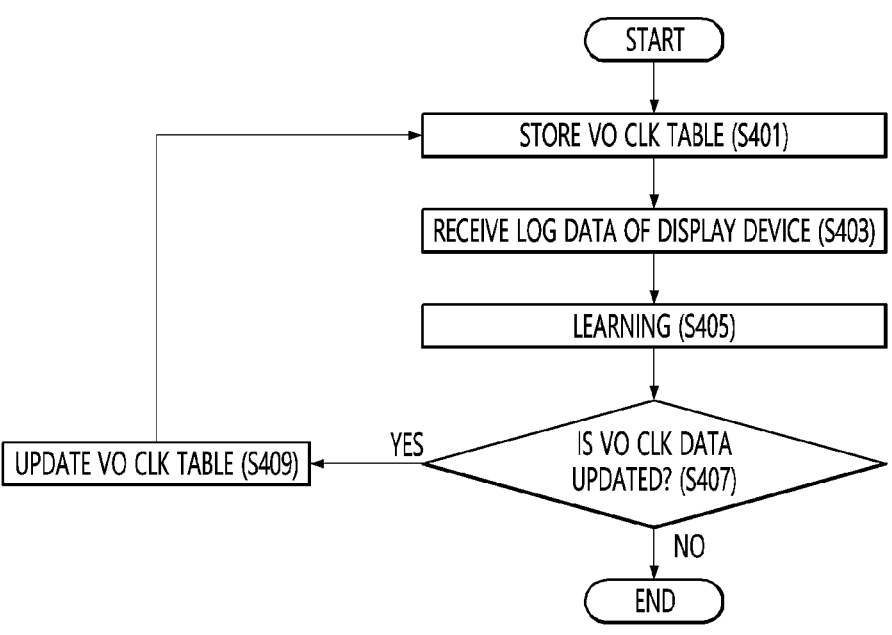

FIG. 13 illustrates a method for updating a pre-generated VO CLK table (lookup table).

Meanwhile, FIG. 13 is described in terms of a server (not shown) for convenience of description, but the present disclosure is not limited thereto. Accordingly, the operation of FIG. 9 may be performed inside the display device 100.

Meanwhile, the update of the VO CLK table described in FIG. 13 may be performed, for example, automatically by the display device 100 according to settings or manually according to a user's request.

Referring to FIG. 13, the server may be configured to receive a VO CLK table of the display device 100 belonging to a network and store the VO CLK table in database (DB) (S401).

The server may be configured to receive log data of the display device 100 (S403). In this case, the reception of the log data may be performed, for example, in a predetermined period (e.g., in units of 1 month, 3 months, 6 months, 1 year, etc.). The reception of the log data may be performed, for example, when a change to mapped values in the VO CLK table is applied. Meanwhile, the log data may be received when the application of a change is a significant change greater than or equal to a threshold Meanwhile, the log data may include log values of all operations of the display device 100 related to the VO CLK frequency, including, for example, temperature and whether there is a data error.

When the server receives the log data from the display device 100 through the step S403, the server may be subjected to training using a previously-generated artificial intelligence learning model (S405).

The server may determine whether to update the VO CLK table for the display device 100 based on the result of the training in step S405 (S407).

As a result of the determination in step S407, if there is an update in the VO CLK data, the server may update and store the VO CLK table to reflect the VO CLK data (S409).

The operations may be performed in an operation sequence different from the operation sequence illustrated in FIGS. 6, 9, and 12 to 13. For example, some of the operations shown in FIGS. 6, 9, and 12 to 13 may be performed simultaneously. Also, some operations may be omitted although they are illustrated in FIGS. 6, 9, and 12 to 13.

As described above, it is possible to automatically set a corresponding VO CLK frequency according to an input, and after the automatic setting, calculate an optimal VO CLK frequency for the input, perform adjustment that is, setting to the set VO CLK frequency, to set the optimal conditions for heat generation and power consumption while preventing image quality damage or deterioration of a video provided by the display device 100, thus preventing an increase in the chip temperature of the chip or lowering the chip temperature and dramatically increasing the lifespan of a corresponding chip and display.

It is possible to automatically set an optimal video output clock frequency corresponding to a corresponding input by adaptively changing the video output clock frequency according to various inputs.

It is possible to set optimal conditions for heat generation and power consumption while preventing a decrease in image quality or deterioration at the same time by adaptively changing the video output clock frequency according to various inputs, thus increasing the lifespans of a board and a display device.

The above-described method may be implemented with codes readable by a processor on a medium in which a program is recorded. Examples of the medium readable by the processor include a Read Only Memory (ROM), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A display device comprising:
a memory;
a display; and
a processor configured to set a first video output clock frequency for an input signal and output a video included in the input signal,
wherein the processor is configured to;
set at least one second video output clock frequency in a background while simultaneously outputting the video based on the first video output clock frequency
and determine one of the at least one second video output clock frequency as an optimal video output clock frequency based on a calculated device performance information including image quality data of an output video and data on a change in chip temperature and power consumption according to each of the at least one second video output clock frequency, and
set the determined optimal video output clock frequency as a video output clock frequency for the input signal,
wherein calculating the device performance information includes:
setting priorities for image quality data of the output video and data on the change in chip temperature and power consumption and assigning weights according to the set priorities; and
summing the weights of the image quality data and the data on the change in chip temperature and power consumption according to the at least one second video output clock frequency.

2. The display device of claim 1, wherein the first video output clock frequency is a predefined video output clock frequency according to a resolution of the input signal.

3. The display device of claim 2, wherein the at least one second video output clock frequency is set to be tuned for the input signal regardless of device performance information according to the first video output clock frequency.

4. The display device of claim 2, wherein the at least one second video output clock frequency is set to be tuned for the input signal according to device performance information according to the first video output clock frequency.

5. The display device of claim 1, wherein the at least one second video output clock frequency is set to be tuned for the input signal based on the first video output clock frequency.

6. The display device of claim 1, wherein the image quality data is used to determine whether the image quality of the output video is deteriorated based on whether at least one image quality factor is enabled, the image quality factor including a Cyclic Redundancy Check (CRC) value for determining whether there is a data error, dynamic color and dynamic contrast, Garmmet, Frame Rate Conversion (FRC) and local dimming.

7. The display device of claim 1, wherein the processor is configured to perform control to set the first video output clock frequency only when there is a change in resolution according to the input signal.

8. The display device of claim 1, wherein the processor is configured to detect an event and extract data in a change in chip temperature and power consumption according to the detected event.

9. The display device of claim 8, wherein the processor is configured to perform control to set the first video output clock frequency when an amount of the extracted change in chip temperature and power consumption is equal to or greater than a threshold compared to previously extracted data on a change in chip temperature and power consumption.

10. The display device of claim 1, wherein the processor is configured to perform control to generate and store a lookup table in which a resolution, a codec, and a video output clock frequency are mapped with respect to an input signal.

11. The display device of claim 10, wherein the processor is configured to extract device performance information-related log data according to each video output clock frequency tuned and set for the input signal, transmit the extracted log data to a server, and update the lookup table.

12. A method for operating a display device, comprising:

detecting a change in resolution according to an input signal;

setting a first video output clock frequency according to a changed resolution and outputting a video based on the set first video output clock frequency;

setting at least one second video output clock frequency in a background while simultaneously outputting the video based on the first video output clock frequency;

determining one of the at least one second video output clock frequency as an optimal video output clock frequency based on a calculated device performance information including image quality data of an output video and data on a change in chip temperature and power consumption according to each of the at least one second video output clock frequency; and setting the determined optimal video output clock frequency as a video output clock frequency for the input signal, wherein calculating the device performance information includes:

setting priorities for image quality data of the output video and data on the change in chip temperature and power consumption and assigning weights according to the set priorities; and summing the weights of the image quality data and the data on the change in chip temperature and power consumption according to the at least one second video output clock frequency.

* * * * *